United States Patent [19]
Baldwin

[11] Patent Number: 5,442,178
[45] Date of Patent: Aug. 15, 1995

[54] CROSS-OVER FIELD-OF-VIEW COMPOSITE FRESNEL LENS FOR AN INFRARED DETECTION SYSTEM

[75] Inventor: John R. Baldwin, Newtown, Conn.

[73] Assignee: Hubbell Incorporated, Orange, Conn.

[21] Appl. No.: 214,459

[22] Filed: Mar. 18, 1994

[51] Int. Cl.$^6$ ............................ G02B 3/08; G01J 5/08
[52] U.S. Cl. ................................... 250/353; 250/342; 250/DIG. 1; 359/742
[58] Field of Search ............... 250/353, 342, DIG. 1; 359/742

[56] References Cited

U.S. PATENT DOCUMENTS

| | | | |
|---|---|---|---|
| 4,275,303 | 6/1981 | Mudge | 250/342 |
| 4,321,594 | 3/1982 | Galvin et al. | 340/567 |
| 4,429,224 | 4/1984 | Wagli et al. | 250/342 |
| 4,442,359 | 4/1984 | Lederer | 250/342 |
| 4,535,240 | 8/1985 | Vigurs | 250/342 |
| 4,717,821 | 1/1988 | Messiou | 250/221 |
| 4,757,204 | 7/1988 | Baldwin et al. | 250/342 |
| 4,841,284 | 6/1989 | Biersdorff | 340/567 |
| 4,876,445 | 10/1989 | McMaster | 359/743 |
| 5,296,707 | 3/1994 | Nozu | 250/353 |

FOREIGN PATENT DOCUMENTS

| | | | |
|---|---|---|---|
| 276502 | 12/1987 | Japan | 359/743 |
| 322202 | 11/1992 | Japan | 359/742 |
| 2122339 | 1/1984 | United Kingdom . | |

*Primary Examiner*—Carolyn E. Fields
*Attorney, Agent, or Firm*—Jerry M. Presson; Michael R. Swartz

[57] ABSTRACT

A cross-over field-of-view composite Fresnel lens for use in an infrared detection system includes a plurality of Fresnel lens segments provided in first and second groups. The first group of Fresnel lens segments are constructed as grooves-in lens segments and arranged in the array as grooves-in lens segments (or, alternatively, are constructed as grooves-out lens segments and arranged in the array as grooves-out lens segments). The second group of the Fresnel lens segments are constructed as grooves-out lens segments but arranged in the array as grooves-in lens segments (or, alternatively, are constructed as grooves-in lens segments but arranged in the array as grooves-out lens segments). This combination results in an array of Fresnel lens segments wherein the lens segments of the first group pass the incident energy without refraction of the fields-of-view thereof whereas the lens segments of the second group refract the fields-of-view of the incident energy, causing cross-over of the fields-of-view of the lens segments G and H of the second group with the fields-of-view of adjacent ones of the lens segments A–F of the first group and resulting in the array of Fresnel lens segments having an expanded composite field-of-view compared to an array of Fresnel lens segments without the cross-over of fields-of-view.

26 Claims, 4 Drawing Sheets

CROSS-OVER FIELD-OF-VIEW COMPOSITE FRESNEL LENS FOR AN INFRARED DETECTION SYSTEM

BACKGROUND OF THE INVENTION

1. Field of the Invention

The present invention generally relates to a passive infrared detection system and, more particularly, is concerned with a cross-over field-of-view composite Fresnel lens for an infrared detection system.

2. Description of the Prior Art

A passive infrared detection system detects heat energy radiated or emitted by an object, such as the body of a person, moving across the field of view of a heat sensor, such as a pyroelectric detector, of the detection system. The detection system must be capable of distinguishing between background temperature and the moving object having a different temperature from the background. Thus, the detection system has an electrical circuit operatively coupled to the heat sensor for producing a detection signal in response to the heat sensor detecting a change of temperature, as for example, caused by the body heat of a person entering the detection pattern.

The sensitive area of the heat sensor is too small to detect a significant amount of heat energy radiated from a human body by using the heat sensor alone. Thus, detection systems typically employ various mirror and/or Fresnel lens arrangements for collecting and focusing a significantly greater amount of heat energy on the heat sensor than would be received using the heat sensor alone. Also, the optics allows the sensor to look in many directions simultaneously.

Many different mirror and/or Fresnel lens arrangements employed in conjunction with heat sensors are known in the prior patent art. A Fresnel lens is a lens resembling a plano-convex or plano-concave lens. One of the opposite sides of the lens is smooth whereas the other side is cut into narrow rings forming annular grooves thereon. Fresnel lens are conventionally arranged either with the infinite or longer conjugate on the grooved side of the lens which is a constructional characteristic commonly referred to as "grooves out" or with the infinite or longer conjugate on the smooth side of the lens which is a constructional characteristic commonly referred to as "grooves in".

Representative examples of mirror and Fresnel lens arrangements are disclosed in U.S. Pat. Nos. to Wagli et al (4,429,224) and Lederer (4,442,359) and of Fresnel lens arrangements alone are disclosed in U.S. patents to Mudge (4,275,303), Galvin et al (4,321,594), Vigurs (4,535,240), Messiou (4,717,821) and Biersdorff (4,821,284) and in a U.K. patent application to Bioice (GB 2,112,339). A significant advantage of a Fresnel lens arrangement alone over a combination mirror and Fresnel lens arrangement is the reduction in the complexity of the arrangement.

Because the combination of a heat sensor with a Fresnel lens arrangement appears to be the more cost-effective approach, but will still constitute a significant portion of the cost of the detection system, the provision of a Fresnel lens arrangement which only requires the use of one heat sensor containing an array of elements and, at the same time, is highly effective and efficient in collecting and focusing heat energy on that heat sensor remains an important objective. The above-cited U.S. patents to Galvin et al and Messiou have proposed different Fresnel lens arrangements which are molded onto either flat or curved sheets of a suitable plastic, such as polyethylene, being transparent to infrared energy within the spectrum of interest while being translucent to visible light. It is perceived by the inventor herein that while the proposed arrangements of the above-cited U.S. patents to Galvin et al and Messiou may represent steps in the right direction, neither has come close to the attainment of the aforementioned objective. Thus, a pressing need still exists to design a Fresnel lens arrangement for use in a passive infrared detection system which will more closely reach the aforementioned objective of cost-effectiveness as well as achieve a 180° field of view.

SUMMARY OF THE INVENTION

The present invention provides a cross-over field-of-view composite Fresnel lens designed to satisfy the aforementioned needs. The cross-over field-of-view composite Fresnel lens of the present invention includes an array of Fresnel lens segments having respective individual fields-of-view which together provide a composite field-of-view of about 180 degrees which increases, without using mirrors, a more limited field-of-view of about 110 degrees of a heat sensor employed in the detection system. Accordingly, the composite Fresnel lens comprises an array of first and second groups of the Fresnel lens segments. The first group of lens segments of the array, which follow the conventional approach, are constructed as grooves-out lens segments and are arranged in the array as grooves-out lens segments or they are constructed as grooves-in lens segments and are arranged in the array as grooves-in lens segments. However, a second group of the Fresnel lens segments of the array, which follow a novel or unconventional approach, are constructed as grooves-out lens segments but are arranged in the array as grooves-in lens segments or they are constructed as grooves-in lens segments but are arranged in the array as grooves-out lens segments. This combination of conventional and novel approaches result in an array of Fresnel lens segments wherein the lens segments in the first group pass the incident energy without refraction of the fields-of-view thereof whereas the lens segments in the second group refract the fields-of-view of the incident energy, and are alternately arranged with adjacent ones of some of the lens segments of the first group so as to provide cross-over of the fields-of-view of the lens segments of the second group with the fields of view of adjacent ones of the lens segments of the first group. Also, the cross-over field-of-view composite Fresnel lens of the present invention takes advantage of known cost-effective manufacturing techniques and materials to form the array of pairs of Fresnel lens segments as a curved- or arcuate-shaped lens on a surface of a molded plastic sheet.

The present invention is also directed to a passive detection system which comprises a housing, and the above-identified composite Fresnel lens having an arcuate shape and the cross-over field-of-view and being mounted across a front opening in the housing in front of the heat sensor. The composite Fresnel lens is operable for focusing heat energy on the heat sensor emanating from a source passing across the field of view. The system also having an electrical circuit connected to the heat sensor and being operable to produce a detection signal in response to a change in temperature in the field of view being sensed by the heat sensor.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
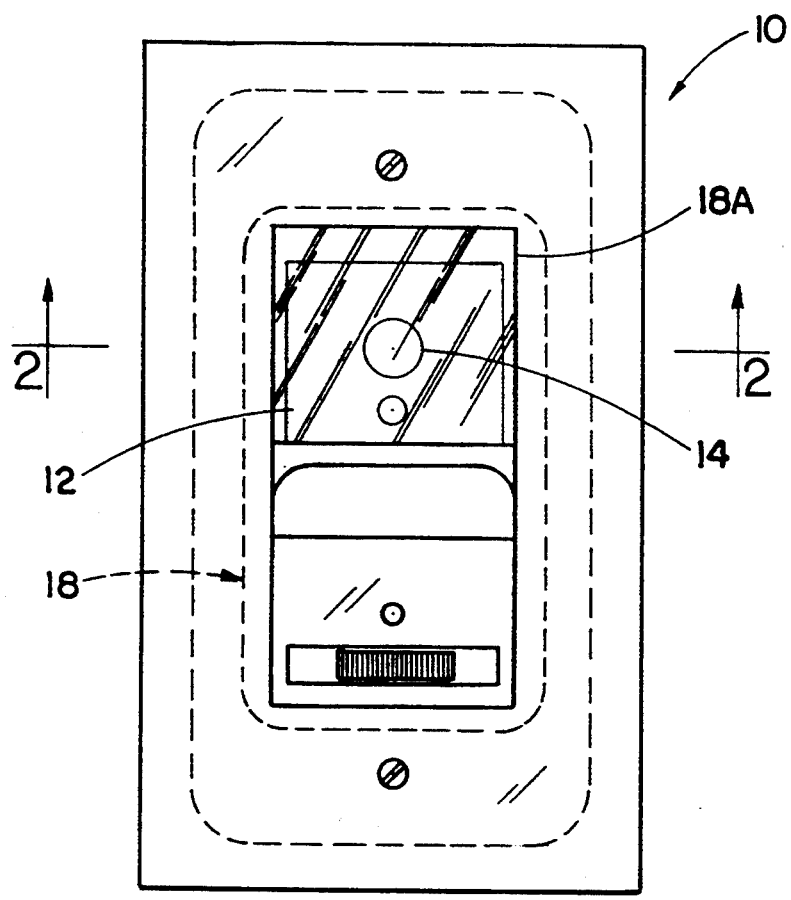
FIG. 1 is a front elevational view of a wall-mounted unit of a passive infrared detection system which incorporates the cross-over field-of-view composite Fresnel lens of the present invention.

In the following description, like reference characters designate like or corresponding parts throughout the several views. Also in the following description, it is to be understood that such terms as "forward", "rearward", "left", "right", "upwardly", "downwardly" and the like, are words of convenience and are not to be construed as limiting terms.

Figure 2:
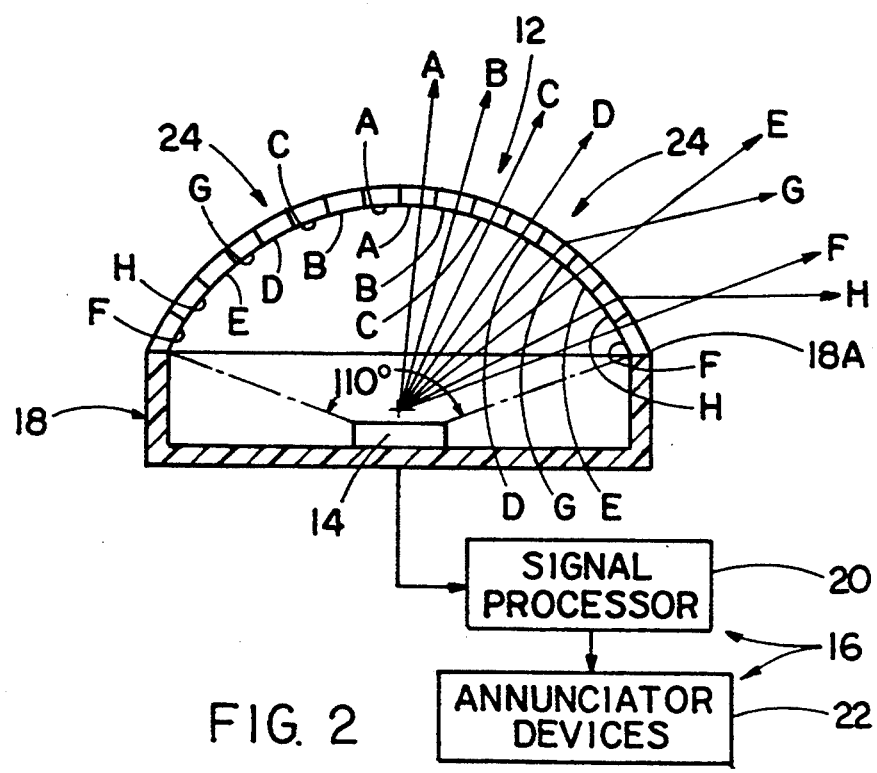
FIG. 2 is a diagrammatic representation of the detection system of FIG. 1 and of the cross-over field-of-view composite Fresnel lens of the present invention.

Referring now to the drawings, and particularly to FIGS. 1 and 2, there is illustrated a passive infrared detection system 10 which incorporates a cross-over field-of-view composite Fresnel lens 12 of the present invention which, for the sake of brevity, will hereinafter be referred to as the composite Fresnel lens 12. The detection system 10 basically includes a heat sensor 14, the composite Fresnel lens 12, and an electrical circuit 16 disposed in a housing unit 18.

The heat sensor 14 of the system 10 may be a pyroelectric detector operable in a well-known manner to detect a change of temperature within the field-of-view of the system 10, for example, such as caused by the body heat of a person passing across the field of view. The composite Fresnel lens 12 of the system 10, having an arcuate shape, is mounted across a front opening 18A in the housing unit 18 in front of heat sensor 14. The composite Fresnel lens 12 is operable for focusing heat energy on the heat sensor 14 emanating from the person passing across the field of view. The electrical circuit 16 typically includes a signal processor 20 connected to the heat sensor 14 and an annunciator device 22 (or a mechanical or solid state relay) connected to the signal processor 20. The signal processor 20 is operable to produce a detection signal when a change in temperature meeting a preset criteria is detected in the heat energy sensed by the heat sensor 14. The annunciator device 22 is operable for generating an audible or visual annunciation in response to the detection signal produced and applied thereto by the signal processor 20. The components implementing the heat sensor 14, signal processor 20 and annunciator device 22 of the detection system 10 are per se conventional and well-known to one of ordinary skill in the art and need not be described nor illustrated in detail for a thorough and complete understanding of the composite Fresnel lens 12 of the present invention.

Figure 3:
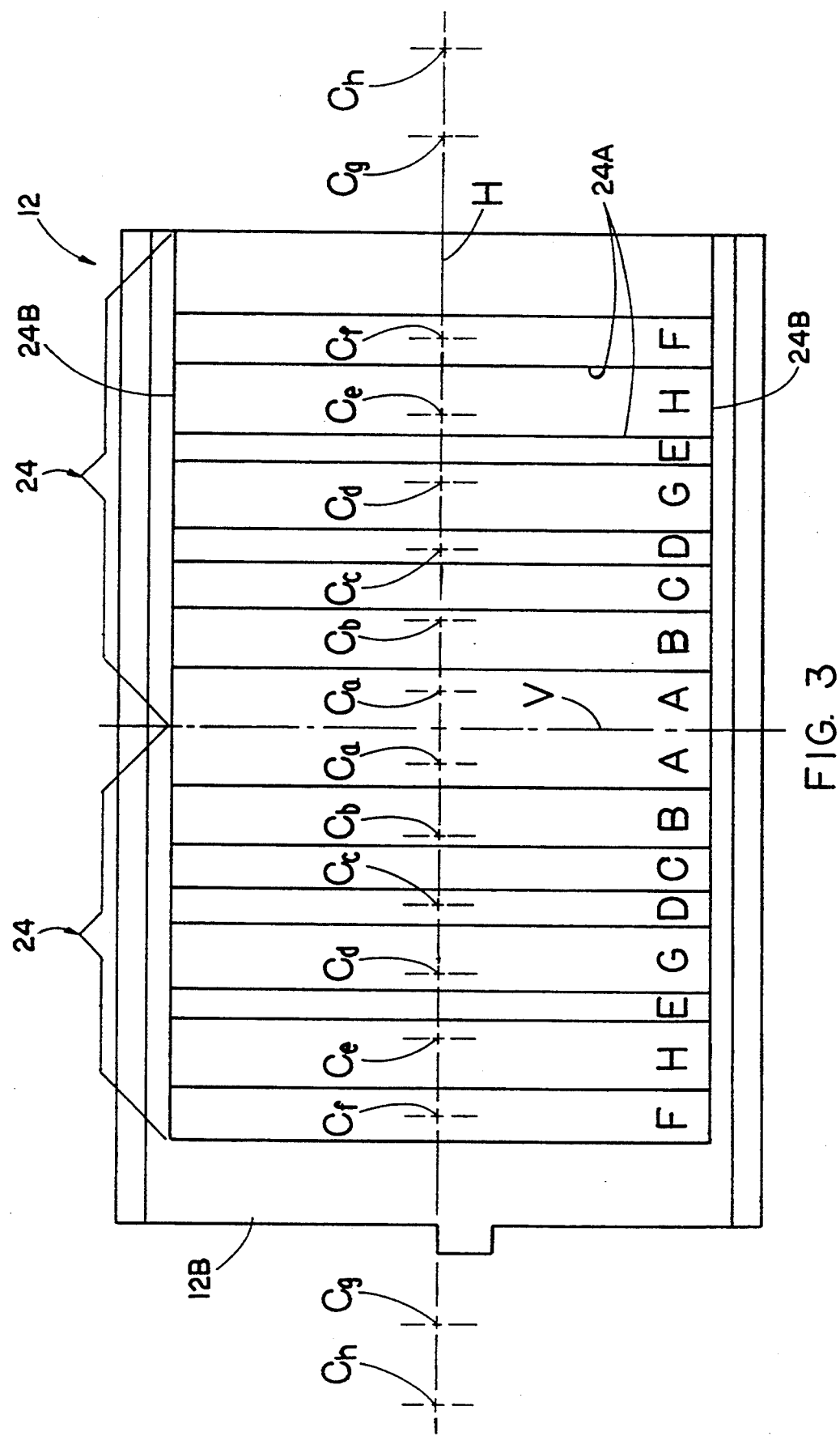
FIG. 3 is another diagrammatic layout view of the rear face of the cross-over field-of-view composite Fresnel lens of the present invention, but now depicting the locations of the optical centers of the pairs of respective Fresnel lens segments of the composite Fresnel lens along a horizontal centerline of the composite Fresnel lens.

Referring to FIGS. 2-6, the composite Fresnel lens 12 of the present invention has front and rear sides 12A, 12B and includes a plurality of Fresnel lens segments 24, which in the illustrated example are a plurality of pairs, with the paired lenses being denoted by letters A-H, and having grooves-in constructions, that is their grooves are formed on the rear, or non-infinite conjugate, side 12B of the lens 12 facing toward the heat sensor 14. As illustrated, but not so limited, the Fresnel lens segments 24 of a given one of the pairs A-H thereof are mirror images of one another and are located at identical positions on the rear side 12B in opposite directions from a vertical centerline V of the composite Fresnel lens 12. FIG. 3 is a diagrammatic layout of the rear side 12B of the composite Fresnel lens 12 depicting along a horizontal centerline H of the composite Fresnel lens 12 the locations of the optical centers $C_a$–$C_h$ of the pairs A-H of respective Fresnel lens segments 24 of the composite Fresnel lens 12. Thus, it is clear from FIG. 3 that the optical centers $C_a$–$C_h$ of the Fresnel lens segments 24 are different from the physical centers thereof.

Figures 4, 5:
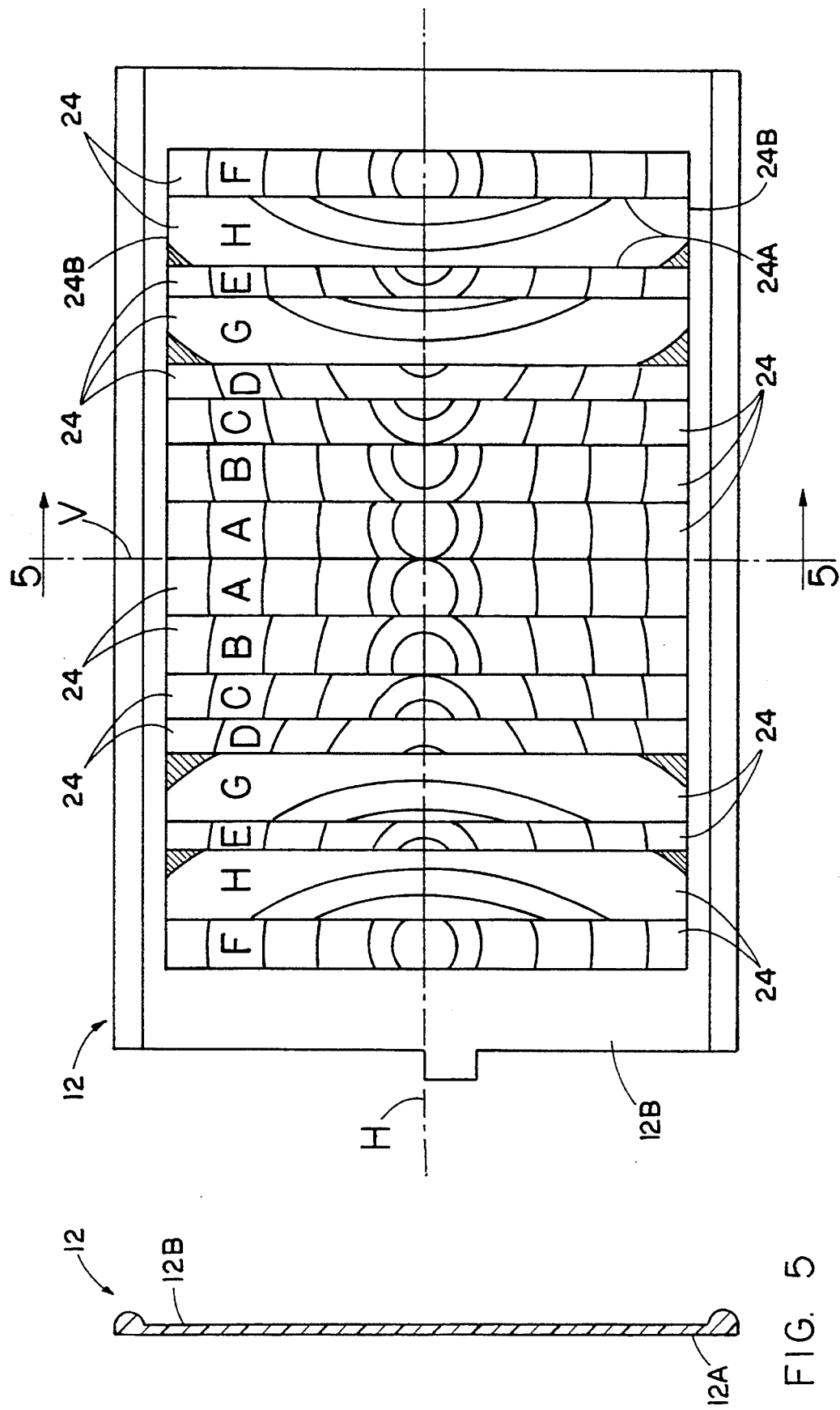
FIG. 4 is a diagrammatic layout view of a rear face of the cross-over field-of-view composite Fresnel lens of the present invention, depicting the concentric ring-like angled lens facets of the array of Fresnel lens segments comprising the cross-over field-of-view composite Fresnel lens.
FIG. 5 is cross-sectional view of the cross-over field-of-view composite Fresnel lens taken along line 4—4 of FIG. 4.

More particularly, the Fresnel lens segments 24 of each pair A-H thereof are identical to a pair of elongated relatively thin mirror image sections of a respective Fresnel lens taken relative to a diametric centerline thereof. A first group of the pairs A-F of the Fresnel lens segments 24 are identical to pairs of mirror image sections taken from a first single Fresnel lens. The remaining second group of the pairs G and H of Fresnel lens segments 24 are identical to pairs of mirror image sections taken from a second single Fresnel lens different from the first single Fresnel lens by having a greater focal length. All of the illustrated Fresnel lens segments 24 have spaced parallel side edges 24A and spaced parallel ends 24B and contain segments of the concentric ring-like angled lens facets of the respective Fresnel lenses; however, their spaced ends and side edges need not be parallel. FIG. 4 illustrates a diagrammatic layout of the rear side 12B of the composite Fresnel lens 12 containing the concentric ring-like angled lens facets or grooves of the arrayed pairs A-H of Fresnel lens segments 24.

Figure 6:
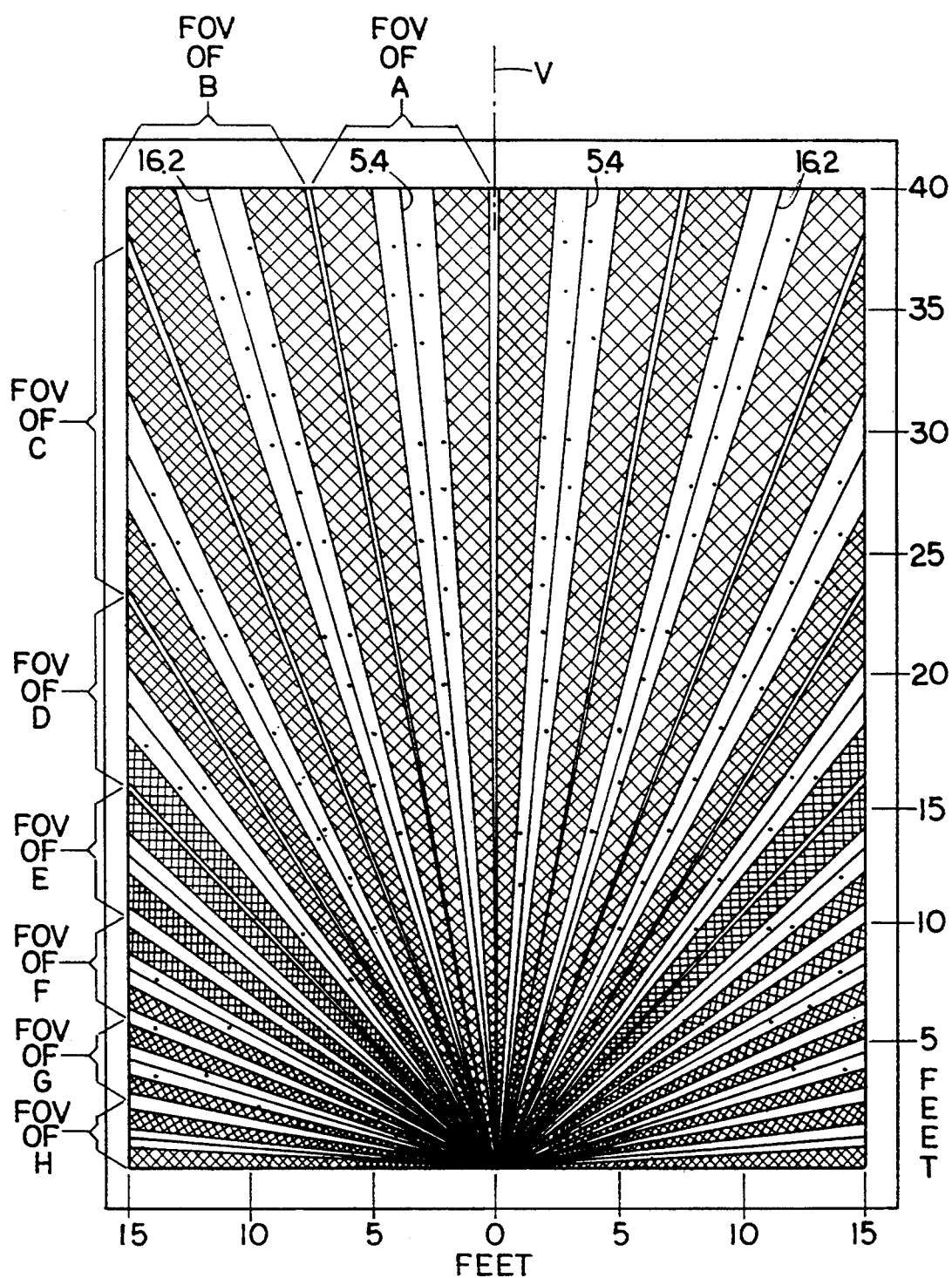
FIG. 6 is a graphical diagrammatic layout view of the respective individual fields-of-view of the Fresnel lens segments of the composite Fresnel lens of the present invention.

Furthermore, the first group of Fresnel lens segments A-F are arrayed together with the second group of Fresnel lens segments G and H relative to the vertical centerline V of the composite Fresnel lens 12 so as to provide cross-over of the fields-of-view of the segments G and H relative to the fields of view of the segments E and F, as shown by the rays in FIG. 2. The cross-over results in a composite field-of-view of about 180 degrees which increases, without using mirrors, a more limited field-of-view of about 110 degrees of a heat sensor employed in the detection system. The first group of Fresnel lens segments A–F of the array, following conventional practice, in the illustrated example may be considered to be constructed as grooves-in lens segments and arranged in the array as grooves-in lens segments (alternatively, they can be considered to be constructed as grooves-out lens segments and arranged in the array as grooves-out lens segments). However, the second group of the Fresnel lens segments G and H of the array, following a novel arrangement originated by the inventor herein, in the illustrated embodiment may be considered to be constructed as grooves-out lens segments but arranged in the array as grooves-in lens segments (alternatively, they can be considered to be constructed as grooves-in lens segments but arranged in the array as grooves-out lens segments). This combining by the inventor herein of the conventional approach with the novel approach results in an array of Fresnel lens segments wherein the lens segments A–F of the first group pass the incident energy without refraction of the fields-of-view thereof whereas the lens segments G and H of the second group refract the fields-of-view of the incident energy, and are alternately arranged with adjacent ones of some of the lens segments of the first group so as to provide cross-over of the fields-of-view of the lens segments G and H of the second group with the fields of view of adjacent ones E and F of the lens segments A–F of the first group. By way of example, the angles of the individual fields-of-view of the respective Fresnel lens segments A–H relative to the vertical centerline V, as depicted in FIG. 6, are as follows: A-5.4°; B-16.2°; C-27.0°; D-37.8°; E-48.6°; F-60.7°; G-72.8°; and H-85.0°.

The above-described pattern design of the composite Fresnel lens 12 is an optimal combination of focal length (hence the heat sensor's field-of-view), the number of Fresnel lens segments (hence the number of individual fields of view in the pattern) and type of Fresnel lens segments (the unconventional pairs G and H combined with the conventional pairs A–F). The pattern design also minimizes dead spaces between the individual fields of view. The cross-over field-of-view scheme of the composite Fresnel lens of the present invention puts the available field-of-view of the heat sensor 14 to maximum use so as to maximize detection in the pattern while retaining significant range. The cross-over field-of-view scheme also permits use of the most sensitive central areas of the individual Fresnel lenses for the six inner fields of view (those with lesser angles of azimuth). Because of the large refraction angles (for instance, 37°) achieved with the unconventional pairs G and H of Fresnel lens segments, they can be located away from the outermost areas of the heat sensor aperture and still provide sufficient sensitivity for the outer two fields of view. Fields-of-view with lesser angles of detection (from the sensor optical axis) are located on the outermost areas of the lens array. This requires the segments looking out with the two largest angles from the sensor optical axis to cross over these outermost segments which are physically (not optically) outermost in the lens array. In addition, the detection pattern has been optimized for a given focal distance. The longer range fields-of-view are closer together than shorter range fields-of-view to reduce gaps between fields-of-view at longer ranges and to approach shorter range gaps at their maximum range (neglecting cosine affects).

Additionally, as the angle from the center of the field-of-view to the sensor optical axis increases, the angular divergence of the field-of-view decreases. The reduced angular divergence results in decreased sensitivity due to Lambertian losses and due to higher frequencies generated by a person walking through the field-of-view. The lens segments at the outer extremes are moved closer to the heat sensor, broadening the fields-of-view of the outer Fresnel lens segments and hence lowering the frequencies generated and recovering some of the lost sensitivity caused by Lambertian losses and frequency shift. The outer lens segments are located closer to the heat sensor than their nominal focal lengths as part of the design and the inner lens segments are located at their nominal focal lengths.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A composite Fresnel lens for use in an infrared detection system, said composite Fresnel lens comprising:
  (a) an array of Fresnel lens segments defined in first and second groups thereof;
  (b) said first group of Fresnel lens segments being constructed as grooves-in lens segments and arranged in said array as grooves-in lens segments;
  (c) said second group of Fresnel lens segments being constructed as grooves-out lens segments but arranged in said array as grooves-in lens segments such that said lens segments of said first group pass incident energy without refraction thereof whereas said lens segments of said second group refract the incident energy and are alternately arranged with some of said lens segments of said first group so as to cause cross-over of fields-of-view of said lens segments of said second group with fields of view of adjacent ones of said lens segments of said first group and resulting in said array of Fresnel lens segments having an expanded composite field-of-view compared to an array of Fresnel lens segments without said cross-over of fields-of-view.

2. The composite Fresnel lens as recited in claim 1, wherein said lens segments are provided in pairs thereof being located at identical positions in opposite directions from a vertical centerline of said composite Fresnel lens.

3. The composite Fresnel lens as recited in claim 2, wherein said Fresnel lens segments of each pair thereof are mirror images of one another.

4. The composite Fresnel lens as recited in claim 2, wherein said Fresnel lens segments of each pair thereof have spaced parallel sides and spaced parallel ends and contain segments of concentric ring-like angled lens facets of said Fresnel lens.

5. The composite Fresnel lens as recited in claim 1, wherein said Fresnel lens segments have respective optical centers and physical centers, said optical centers of most of said Fresnel lens segments being disposed at different locations from said physical centers thereof.

6. The composite Fresnel lens as recited in claim 1, wherein said Fresnel lens segments of said first group are elongated mirror image sections of a respective first Fresnel lens taken relative to a diametric centerline of said first Fresnel lens.

7. The composite Fresnel lens as recited in claim 6, wherein said Fresnel lens segments of said second group are elongated mirror image sections of a respective second Fresnel lens taken relative to a diametric centerline of said second Fresnel lens and having a greater focal length than said first Fresnel lens.

8. The composite Fresnel lens as recited in claim 1, wherein said Fresnel lens segments of said second group are located relative to a vertical centerline of said composite Fresnel lens progressively farther physically from said vertical centerline than most of said Fresnel lens segments of said first group.

9. A composite Fresnel lens for use in an infrared detection system, said composite Fresnel lens comprising:
   (a) an array of Fresnel lens segments defined in first and second groups thereof;
   (b) said first group of Fresnel lens segments being constructed as grooves-out lens segments and arranged in said array as grooves-out lens segments;
   (c) said second group of Fresnel lens segments being constructed as grooves-in lens segments but arranged in said array as grooves-out lens segments such that said lens segments of said first group pass incident energy without refraction thereof whereas said lens segments of said second group refract the incident energy and are alternately arranged with some of said lens segments of said first group so as to cause cross-over of fields-of-view of said lens segments of said second group with fields of view of adjacent ones of said lens segments of said first group and resulting in said array of Fresnel lens segments having an expanded composite field-of-view compared to an array of Fresnel lens segments without said cross-over of fields-of-view.

10. The composite Fresnel lens as recited in claim 9, wherein said lens segments are provided in pairs thereof being located at identical positions in opposite directions from a vertical centerline of said composite Fresnel lens.

11. The composite Fresnel lens as recited in claim 10, wherein said Fresnel lens segments of each pair thereof are mirror images of one another.

12. The composite Fresnel lens as recited in claim 10, wherein said Fresnel lens segments of each pair thereof have spaced parallel sides and spaced parallel ends and contain segments of concentric ring-like angled lens facets of said Fresnel lens.

13. The composite Fresnel lens as recited in claim 9, wherein said Fresnel lens segments have respective optical centers and physical centers, said optical centers of most of said Fresnel lens segments being disposed at different locations from said physical centers thereof.

14. The composite Fresnel lens as recited in claim 9, wherein said Fresnel lens segments of said first group are elongated mirror image sections of a respective first Fresnel lens taken relative to a diametric centerline of said first Fresnel lens.

15. The composite Fresnel lens as recited in claim 14, wherein said Fresnel lens segments of said second group are elongated mirror image sections of a respective second Fresnel lens taken relative to a diametric centerline of said second Fresnel lens and having a greater focal length than said first Fresnel lens.

16. The composite Fresnel lens as recited in claim 9, wherein said Fresnel lens segments of said second group are located relative to a vertical centerline of said composite Fresnel lens progressively farther physically from said vertical centerline than most of said Fresnel lens segments of said first group.

17. A passive detection system, comprising:
   (a) a housing;
   (b) a heat sensor mounted in said housing;
   (c) a composite Fresnel lens having an arcuate shape and cross-over fields-of-view and being mounted across a front opening in said housing in front of said heat sensor, said composite Fresnel lens being operable for focusing heat energy on said heat sensor emanating from a source passing across said fields of view; and
   (d) an electrical circuit connected to said heat sensor and being operable to produce a detection signal in response to a change in temperature in said fields of view being sensed by said heat sensor;
   (e) said composite Fresnel lens comprising
      (i) an array of Fresnel lens segments defined in first and second groups thereof,
      (ii) said first group of Fresnel lens segments being constructed as grooves-in lens segments and arranged in said array as grooves-in lens segments,
      (iii) said second group of Fresnel lens segments being constructed as grooves-out lens segments but arranged in said array as grooves-in lens segments such that said lens segments of said first group pass incident energy without refraction thereof whereas said lens segments of said second group refract the incident energy and are alternately arranged with some of said lens segments of said first group so as to cause cross-over of fields-of-view of said lens segments of said second group with fields of view of adjacent ones of said lens segments of said first group and resulting in said array of Fresnel lens segments having an expanded composite field-of-view compared to an array of Fresnel lens segments without said cross-over of fields-of-view.

18. The system as recited in claim 17, wherein said Fresnel lens segments have respective optical centers and physical centers, said optical centers of most of said Fresnel lens segments being disposed at different locations from said physical centers thereof.

19. The system as recited in claim 17, wherein said Fresnel lens segments of said first group are elongated mirror image sections of a respective first Fresnel lens taken relative to a diametric centerline of said first Fresnel lens.

20. The system as recited in claim 19, wherein said Fresnel lens segments of said second group are elongated mirror image sections of a respective second Fresnel lens taken relative to a diametric centerline of said second Fresnel lens and having a greater focal length than said first Fresnel lens.

21. The system as recited in claim 19, wherein said Fresnel lens segments of said second group are located relative to a vertical centerline of said composite Fresnel lens progressively farther physically from said vertical centerline than most of said Fresnel lens segments of said first group.

22. A passive infrared detection system, comprising:
(a) a housing;
(b) a heat sensor mounted in said housing;
(c) a composite Fresnel lens having an arcuate shape and a cross-over field-of-view and being mounted across a front opening in said housing in front of said heat sensor, said composite Fresnel lens being operable for focusing heat energy on said heat sensor emanating from a source passing across said field of view; and
(d) an electrical circuit connected to said heat sensor and being operable to produce a detection signal in response to a change in temperature in said field of view being sensed by said heat sensor;
(e) said composite Fresnel lens comprising
  (i) an array of Fresnel lens segments defined in first and second groups thereof,
  (ii) said first group of Fresnel lens segments being constructed as grooves-out lens segments and arranged in said array as grooves-out lens segments,
  (iii) said second group of Fresnel lens segments being constructed as grooves-in lens segments but arranged in said array as grooves-out lens segments such that said lens segments of said first group pass incident energy without refraction thereof whereas said lens segments of said second group refract the incident energy and are alternately arranged with some of said lens segments of said first group so as to cause cross-over of fields-of-view of said lens segments of said second group with fields of view of adjacent ones of said lens segments of said first group and resulting in said array of Fresnel lens segments having an expanded composite field-of-view compared to an array of Fresnel lens segments without said cross-over of fields-of-view.

23. The system as recited in claim 22, wherein said Fresnel lens segments have respective optical centers and physical centers, said optical centers of most of said Fresnel lens segments being disposed at different locations from said physical centers thereof.

24. The system as recited in claim 22, wherein said Fresnel lens segments of said first group are elongated mirror image sections of a respective first Fresnel lens taken relative to a diametric centerline of said first Fresnel lens.

25. The composite Fresnel lens as recited in claim 24, wherein said Fresnel lens segments of said second group are elongated mirror image sections of a respective second Fresnel lens taken relative to a diametric centerline of said second Fresnel lens and having a greater focal length than said first Fresnel lens.

26. The composite Fresnel lens as recited in claim 22, wherein said Fresnel lens segments of said second group are located relative to a vertical centerline of said composite Fresnel lens progressively farther physically from said vertical centerline than most of said Fresnel lens segments of said first group.

* * * * *